United States Patent
Parke

[19]

[11] Patent Number: 6,058,822
[45] Date of Patent: May 9, 2000

[54] SIZE REDUCTION APPARATUS

[76] Inventor: Terrence J Parke, 16 Cameron Court, Toolern Downs, Melton, VIC, 3337, Australia

[21] Appl. No.: 09/101,487
[22] PCT Filed: Jan. 10, 1997
[86] PCT No.: PCT/AU97/00007
§ 371 Date: Jul. 14, 1998
§ 102(e) Date: Jul. 14, 1998
[87] PCT Pub. No.: WO97/26103
PCT Pub. Date: Jul. 24, 1997

[30] Foreign Application Priority Data

Jan. 15, 1996 [AU] Australia ................................. PN7554

[51] Int. Cl.$^7$ .................................................. B23D 19/06
[52] U.S. Cl. ........................ 83/425.2; 241/166; 241/236
[58] Field of Search .................................. 83/425.4, 496, 83/498, 500, 113, 120, 122; 241/166, 167, 205, 236

[56] References Cited

U.S. PATENT DOCUMENTS

| | | | |
|---|---|---|---|
| 3,246,553 | 4/1966 | O'Brien | 83/302 |
| 4,172,400 | 10/1979 | Brierley | 83/500 |
| 4,232,577 | 11/1980 | Wallmann et al. | 83/496 |
| 4,307,637 | 12/1981 | Vanderhulst | 83/500 X |
| 4,374,573 | 2/1983 | Rouse et al. | 241/167 X |
| 4,385,732 | 5/1983 | Williams | 241/167 |
| 4,560,112 | 12/1985 | Rouse et al. | 241/236 |
| 4,836,073 | 6/1989 | Castiglioni | 83/507 X |
| 5,094,392 | 3/1992 | Szombathy | 241/167 |
| 5,152,469 | 10/1992 | Dicky | 241/236 |
| 5,285,707 | 2/1994 | Lodovico et al. | 83/500 X |
| 5,395,057 | 3/1995 | Williams, Jr. et al. | 241/236 X |
| 5,562,255 | 10/1996 | Witko et al. | 241/236 X |

FOREIGN PATENT DOCUMENTS

| | | |
|---|---|---|
| 54-119185 | 9/1979 | Japan. |
| 8-025136 | 1/1996 | Japan. |
| 1618525 | 1/1991 | Russian Federation. |
| WO 90/03242 | 4/1991 | WIPO. |

*Primary Examiner*—M. Rachuba
*Assistant Examiner*—T. Anthony Vaughn
*Attorney, Agent, or Firm*—Killworth, Gottman, Hagan & Schaeff, LLP

[57] ABSTRACT

A shredding apparatus is described which comprises at least one module of a pair of counter-rotating cutting assemblies located in spaced apart parallel relationship wherein each assembly comprises a driving shaft upon which is mounted one or more cutters. The cutters are provided with a pair of cutting surfaces or edges which are located at either end of the cutter. In the one module the cutting surfaces of adjacent cutters mounted on adjacent shafts are in contact with each other over at least a part of the circumference of the cutting surfaces so that when the cutters counter-rotate, material fed between them is cut by the action of the counter rotating cutters. An anti-wrap member is associated with a driving shaft to prevent material being cut from wrapping around the shaft or cutter.

27 Claims, 3 Drawing Sheets

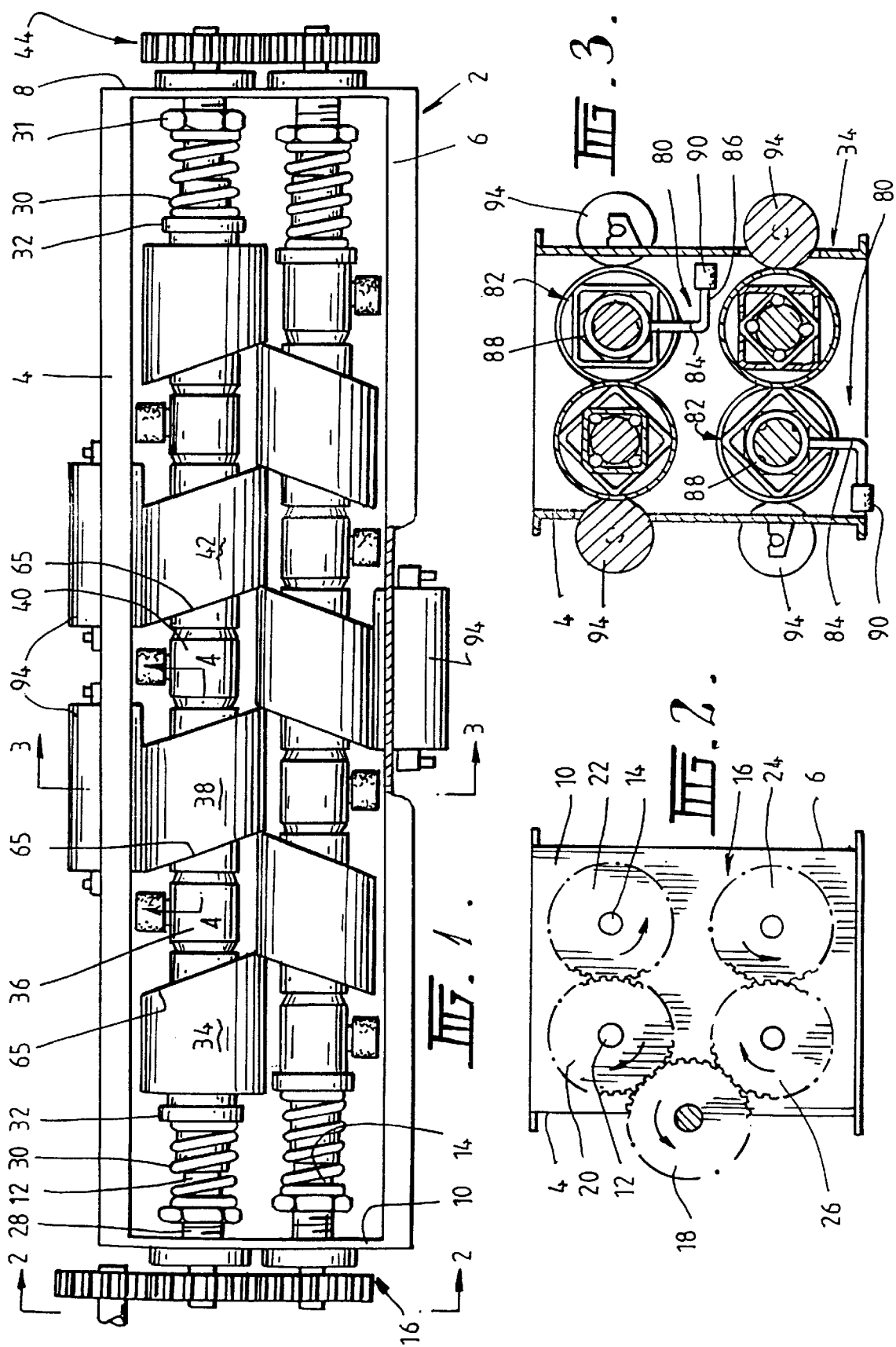

SIZE REDUCTION APPARATUS

The present invention relates generally to material treatment industries, particularly recycling and waste disposal industries. In particular the present invention relates to apparatus, appliances and assemblies that may be used to cut, crush, pulverise, comminute or otherwise reduce in size materials, particularly waste or scrap materials, so as to convert the waste or scrap materials into a size which is more useable or useful, such as for example, for use in further processing in the manufacture of goods or for more efficient or advantageous final disposal of the waste or scrap material. Even more particularly, the present invention relates to an apparatus, appliance, assembly or installation equipped with a cutting means having one or more cutting elements and/or provided with cutting assemblies for reducing the size of materials. The cutting means and/or assemblies including the cutting elements of the present invention cooperate with each other to reduce the size of the material and may be used in a variety of applications to cut or otherwise reduce in size a wide variety of different materials. One particular application relates to reducing the size of scrap materials, such as for example, tires or scrap iron or metals for subsequent recycling into other useful products. Another application is to recycle domestic or industrial waste by considerably reducing the size of the waste material to small sized particles which can then be readily reused or disposed of.

Although the present invention will be described with particular reference to an installation for reducing the size of tires, scrap metal, domestic rubbish and the like, comprising a plurality of cooperatively engaging cutting elements optionally with other accessories or attachments, such as for example anti-wrap bars or similar, it is to be noted that the present invention is not limited in scope to this embodiment but rather it is more extensive in scope so as to include other arrangements and installations of the cutting apparatus, to other forms of the cutting elements and accessories or attachments and to uses of the apparatus and elements in other applications in respect of a wide variety of different materials.

As time goes by more and more concern is being expressed over the rate of consumption of raw materials and over the rate at which waste materials are being generated. In particular, great concern is being expressed over the amount of and the nature of waste materials which are being disposed of due to the manifold adverse effects that such disposal has on the environment. The concern has even gone so far that fear has been expressed that at some time in the not too distant future there may be serious shortages of one or other raw materials and that the adverse effects on the environment of the disposal of waste materials may be so great so as to permanently damage the environment. Serious environmental damage can arise through the careless disposal of waste or scrap materials in a form which cannot be readily degraded or converted into a more beneficial or useful form. Therefore, if it were possible to recycle more materials or to render the potentially polluting materials into a more benign or inert form prior to disposal, not only would the consumption of raw materials be reduced in the first instance but there would be less waste or scrap materials requiring disposal and accordingly there would be less harmful effects on the environment.

Therefore, it is an aim of the present invention to at least alleviate the adverse effects on the environment due to the disposal of waste materials by converting the waste materials into a form which causes less harm to the environment and which may be more readily disposed of and which may be recycled in greater quantities. The present invention sets out to achieve this aim by providing an apparatus having a cutting assembly provided with one or more cutting elements or similar arrangement that can be used to recycle materials or convert materials into a form which is more useful or useable. Typically, the waste materials are reduced in size after passing one or more times through the apparatus of the present invention.

It is to be noted that the use of the terms "cutters", "cutting elements", "cutting assemblies", "cutting surfaces" and the like used throughout the present specification is not meant to be limiting by referring to the operation of reducing the size of materials by cutting only, but rather is merely used by way of explanation for clarity and ease of understanding and is meant to include within its scope all operations for reducing the size of a wide variety of materials. Such size reducing operations include, but are not limited to shredding, crushing, pulverising, grinding, comminuting and the like. Therefore, any operation which reduces the size of materials is included within the meaning of the term "cutting" or similar as used in the present specification and within the scope of the present invention.

The apparatus of the present invention finds utility in a variety of different applications ranging from paper shredding of office wastes up to crushing and cutting wrecked or scrapped car bodies, shredding tires, particularly motor car tires, with many and varied other uses, such as for example as an apparatus for the disposal of domestic, household or commercial waste, as an apparatus for recycling motor vehicle tires, as an apparatus for recycling garden refuse such as branches, logs and the like. Almost all materials may be treated by the apparatus and method of the present invention.

According to the present invention there is provided an apparatus for reducing the size of material comprising at least one pair of cooperating cutters, said cutters being each rotatable about respective spaced apart substantially parallel axes, each of said cutters having at least one continuous cutting surface disposed circumferentially around said respective axes of rotation, said cutters being arranged with respect to each other to rotate simultaneously in opposite directions about their respective rotary axes with at least a part of the respective cutting surfaces of the cutters being in contact with each other, said cutting surfaces cooperating with each other to reduce the size of materials located therebetween in use as the cutters rotate simultaneously, wherein said cutting surfaces are each oppositely inclined to one another and are angularly inclined with respect to the parallel axes of rotation, and wherein there is provided at least one anti-wrap member or element for preventing material being reduced in size by the apparatus from rotating about the axes of rotation of the cutters as the cutters rotate.

According to another aspect of the present invention there is provided a cutting assembly including at least one pair of cooperating rotary cutters in the form of truncated cylindrical tubes, each of the cutters forming the one pair of cutters being rotatable in unison about respective spaced apart parallel axes, each cutter having a substantially continuous cutting surface disposed obliquely about said respective axes of rotation around the perimeter of the cutter, wherein the cutting surface of one of the cutters is oppositely angularly inclined to the cutting surface of the other of the cutters, and wherein a part of each of the cutting surfaces are cooperatively engaged with each other so that in use the cutters rotate in opposite directions to cut material located between the cutting surfaces and wherein there is provided an anti-wrap member for preventing rotation of the material being cut from rotating about the respective axes of rotation of the cutters as the cutters rotate.

Typically, the apparatus of the present invention has one, two, three, four or more modules of cutter assemblies, each module containing two or more cutter assemblies. More typically, the apparatus has a plurality of rotary cutters in which the cutters are arranged in an array. Typically, the array is configured so that all of the cutters rotate simultaneously. More typically, the cutters are arranged so that each alternative cutter assembly rotates in the same direction which is the opposite direction of rotation to that of the adjacent cutters.

Typically, in one embodiment, the individual cutters are arranged in regularly spaced apart rows and columns in which the cutters forming an individual column are all arranged in the same vertical plane and the cutters forming an individual row are all aligned in the same horizontal plane. The cutters may be spaced apart at regular intervals or may be spaced apart at different amounts or may be located with no spaces therebetween either in the horizontal or vertical direction or in any direction.

Typically, in another embodiment, the modules of cutter assemblies can adapt any orientation or configuration with respect to each other, such as for example a first module of two or more assemblies may be arranged transversely to a second module of two or more assemblies. Even more typically, the modules may be arranged at any angle to each other in any plane. One typical arrangement is to have the modules arranged substantially perpendicular to each other but spaced apart from each other or similar.

Typically, in another embodiment, the cutters are arranged in a herringbone-like or zig-zag type pattern when viewed in cross-section or from one side so that each alternate vertical column is aligned under each other and is spaced apart vertically from each adjacent vertical column and each alternate horizontal row is aligned under each other but spaced apart horizontally from each adjacent horizontal row. Typically, the cutter assemblies are spaced relatively greater apart in a vertical direction. Typically, each of the rotary cutters is mounted on a shaft. Typically, each shaft has one, two, three, four or more individual cutters mounted thereon to form a single cutting assembly.

Typically, the shaft for receiving the cutters is provided with one form of an engagement means in the form of lengthwise extending grooves. Typically, there are four such grooves regularly spaced apart around the circumference of the shaft. More typically, ball bearings or similar means, complementary to the engagement means of the shaft, are located in the lengthwise extending grooves for attaching the cutters to the shaft and for allowing axial movement of the cutters with respect to the shaft in use of the cutting apparatus.

Typically, in one embodiment, each cutter is made up from a number of thin walled tubes of differing sizes and configuration. More typically, the cutters are provided with two substantially rectangular cross-section tubes of different sizes rotated about 45° to each other. Even more typically, the outer tube which is also the larger tube is connected to the substantially cylindrical cutter.

Typically, in another embodiment, the cutter is a one piece casting.

Typically, each cutter is spring loaded, spring biased or spring mounted on the shaft which allows axial movement of each cutter with respect to the shaft. Typically, the spring means providing for the axial movement of the cutter is a compression spring mounted on the shaft. Typically, there are two such springs. More typically, the spring means urges the cutting surfaces of adjacent cutters on adjacent shafts into engagement with each other in order to maintain part of the respective cutter surfaces of the cutters in intimate contact with each other during rotation of the cutters.

Typically, the rotary cutters are substantially cylindrical. More typically, the rotary cutters are thin walled hollow outer cylinders. More typically, the cutting surfaces extend continuously circumferentially around the cutters. More typically, the cutting surface of each cutter is arranged obliquely to the central axis of the cutter. Even more typically, the cutters are provided with two obliquely inclined cutting surfaces located at either end of the cutter. Even more typically, the cutting surfaces are inclined at about 20°0 to the axis of rotation of the cutter. Typically, both cutting surfaces are inclined at about 20° to the axis of rotation.

Typically, each cutter is of a one piece construction having a central portion for engaging with the central shaft and an annular portion being provided with continuous cutting surfaces. More typically, the central portion is provided with means for engaging corresponding means on the shaft to facilitate driving of the cutter. More typically, the cutter is provided with integral collar means for stabilising the cutter on the shaft to prevent unwanted rocking movement of the cutter with respect to the shaft when on the shaft.

If there is more than a single cutter located on a shaft, all of the cutters on the shaft are arranged so that the cutting surfaces are collectively aligned with each other in the same direction. Typically all cutting surfaces are angularly inclined with the axes of rotation at about the same angle and are aligned substantially parallel to each other.

More typically, the cutting surfaces of adjacent cutters are oppositely inclined to each other. Typically, the cutting surfaces are inclined at an angle of between 20° and 60°, preferably 45° to the central axis. However, it is to be noted that the cutting surfaces may be arranged at any angle to the respective central axis.

Typically, the anti-wrap member of the present invention comprises a first part which is substantially L-shaped and a second part which has a substantially circular collar arrangement attached at one end to the L-shaped body portion. Typically, the central or driving shaft is received in the circular collar thus allowing pivoting movement, preferably backwards and forwards, of the anti-wrap element about the shaft in use. More typically, the anti-wrap element is provided with a slidable scraper blade capable of slidable axial movement with respect to the lengthwise extending direction of the shaft.

Typically, the anti-wrap member is a chain having a circular ring at each end in which the ring at one end is adapted to receive a driving shaft and the ring at the other end is fixedly mounted on an auxiliary shaft, the chain being able to flex between the two rings.

Typically, the cutting apparatus of the present invention is provided with a feed means and a discharge means. More typically, the apparatus is provided with a material containment means facilitating recycling of the material through the apparatus so that the material is repeatedly passed through the cutters to reduce the size of the material to a predetermined size.

Typically, the cutting surfaces are self sharpening. Typically, the cutting surfaces are spaced apart from the shaft. Typically, the cutting surfaces are smooth. Alternatively, the cutting surfaces may be provided with surface modifications or irregularities in order to assist in feeding, retaining or maintaining material between adjacent cutters during use. Typically, the cutters are provided with troughs and crests in the form of cleats, bars, bosses or other surface projections on their surface.

Typically, rubber inserts in the form of spacers are provided externally around each cutter as a means to prevent materials wrapping around the shafts, cutters or the like. More typically, each cutter is provided with a replaceable cutting ring around the circumference of the cutter so that the cutting ring may be readily replaced when blunt or damaged. Typically, the cutting ring can be profiled to provide a contoured cutting surface. More typically, the slidable blade scraper is in contact with the cutting surface of the cutter or the replaceable cutting ring.

Typically, the rotary cutter is a hollow cylinder having an obliquely inclined wall, with the edge of the wall forming the cutting surface. Typically, the edge is ground, such as for example hollow ground to facilitate cutting of the material. Alternatively, the edge is serrated or otherwise contoured or profiled.

Typically, rubber cylinders may be mounted on the shafts between the cutters which are spaced on either side of the rubber cylinders to prevent material from falling down between the cutters and thus not being reduced in size in use of the apparatus of the present invention.

Typically, the space between the shaft and the cutting surface may be filled with a rubber annulus.

In order that the invention may be more readily understood and put into practical effect, the present invention will now be described by way of example with reference to the accompanying drawings which illustrate one embodiment of the invention and wherein:

FIG. 1 is a plan view of one form of the cutting installation of the present invention showing two sets of cutter assemblies in spaced apart parallel relationship on two adjacent rotating shafts;

FIG. 2 is an end view of the installation taken along the line 2—2 of FIG. 1;

FIG. 3 is a cross-sectional view taken along the line 3—3 of FIG. 1;

Figure 4:
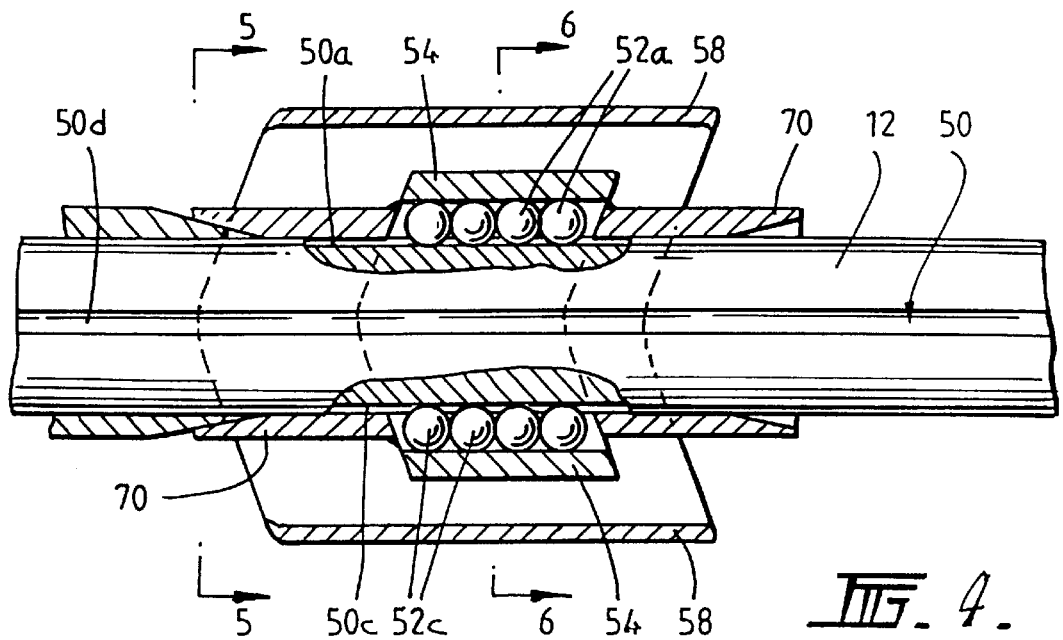
FIG. 4 is a partial cross-sectional view taken along the line 4—4 of FIG. 1.
Figure 6:
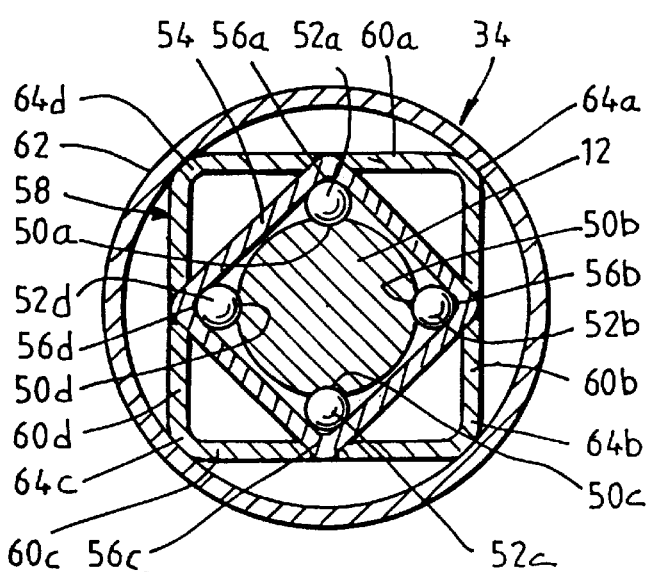
FIG. 6 is a cross-sectional view taken along the line 6—6 of FIG. 4.
Figure 5:
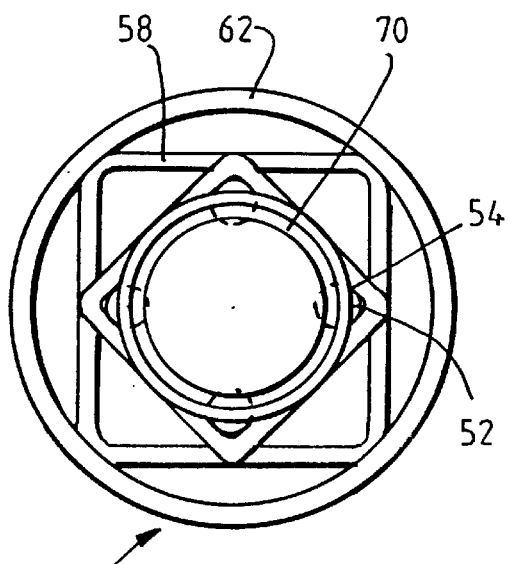
FIG. 5 is a cross-sectional view taken along the line 5—5 of FIG. 4.

Referring to FIGS. 1 to 7, it can be seen that one form of the installation of the present invention is illustrated. It is to be noted that two sets or two modules of rotary cutter assemblies are shown in the drawings merely for the sake of clarity and brevity of description. Each module or set of assemblies comprises two shafts upon which the actual cutters are mounted.

However, any number of cutter assemblies arranged in any arrangement, carrying any number of cutters on the shafts, may be present in the apparatus of the present invention.

In FIG. 1 there is shown an installation 2. In installation 2 there are two lengthwise extending walls 4, 6 and two transverse extending walls 8, 10 forming the framework of the structure 2. Two lengthwise extending shafts 12, 14 are journalled in walls 8, 10 at either end of the shafts and extend therebetween for allowing rotation of the shafts 12, 14 in use. A set of intermeshing gear wheels 16 is provided at one end of installation 2 in proximity to transverse wall 10. The intermeshing gears 16 comprise a main driving gear 18 for driving meshed driven gear wheels 20, 22, 24, 26. It is to be noted that only two shafts 12, 14 are shown in FIG. 1 which are connected to driven gears 20, 22 respectively. Two shafts similar to 12 and 14 are associated with gears 24, 26 and are not shown. In operation, driven gear 18 is rotated by a suitable driving means (not shown), such as for example an electric motor, hydraulic motor, internal combustion engine or the like, which causes corresponding rotation in the appropriate direction of gears 20, 22, 24 and 26 and hence shafts 12, 14. One such set of directions of rotation is shown by the arrows in FIG. 2.

As all of the shafts and cutter assemblies of the present invention are the same or substantially the same, only one shaft and cutter assembly will be described in detail for the sake of clarity. Modifications to the assembly are possible within a module of two assemblies. It is to be noted that the array of modules, and of the cutter assemblies, can take any shape, configuration or orientation depending on the requirements of the material being cut, such as for example the modules all being arranged substantially parallel, or substantially perpendicular, or at any angle in between including any plane.

Shaft 12 extending between walls 8, 10 is provided with a threaded portion 28 adjacent to the internal surface of transverse wall 10. A nut arrangement 31 is provided on the threaded portion 28 for adjusting the force applied by compression spring 30 provided over the end of shaft 12. Collar 32 provides a stop for the other end of compression spring 30. A first cutter 34 is provided on shaft 12 and a first anti-wrap bar 36 is located on shaft 12 between the first cutter 34 and a second cutter 38. Similarly, a second anti-wrap bar 40 is then located on shaft 12 between the second cutter 38 and a third cutter 42 and so on, such that cutters and anti-wrap bars are located alternately along the length of shaft 12 to form a cutting assembly. A similar collar 32, compression spring 30 and nut arrangement 31 is provided at the other end of shaft 12 as is also provided a second set of intermeshing driven gear wheels 44 for permitting simultaneous rotation of the shafts 12, 14 in opposite directions. It is to be noted that the second set of gear wheels 44 does not have a driving gear corresponding to driving gear 18.

With particular reference to FIGS. 3 to 6, there is shown one form of the cutters of the present invention. Shaft 12 is provided with four lengthwise extending parallel grooves 50a, 50b, 50c, 50d at regularly spaced apart locations around the diameter of the shaft. The grooves extend along the entire length of shaft 12 apart from the threaded portions 28 at each end of the shaft beyond the position of collars 32. The grooves form tracks in which ball bearings 52a, 52b, 52c, 52d are able to rotate therealong in an axial direction to allow the cutter 34 to move axially in use along shaft 12 if required as it rotates. A first inner portion 54 of the cutter 34 is made from a short length of square section tubing of a size which allows the ball bearings 52 to be located in each of the four corners 56a, 56b, 56c, 56d of the inner square section tubing 54 as the cutter 34 is received on shaft 12 in use. Thus the substantially right angular corners 56 of the square section tubing 54 forms the other bearing surface or track for rotation of the ball bearings axially along shaft 12 in combination with tracks 50.

A second outer square section tubular section 58 is connected to the first square section tubing 54 by welding or similar such that each corner 56 of the first tubing 54 of smaller sized square section is located about the mid points of the sides 60*a*, 60*b*, 60*c*, 60*d* of the larger outer square section tubing 58.

The circular cutting section 62 of the cutter 34 is welded to the four outer corners 64*a*, 64*b*, 64*c*, 64*d* of the larger outer square section 58 to form the cutter 34. One or both surfaces 64 of the cutter 34 are arranged to extend obliquely to the lengthwise extending axis of shaft 12.

A circular collar 70 formed from a short length of round tubing is then fastened, such as by welding, to either end of the cutter 34 to retain the ball bearings 52 in place in use and also for providing for a bearing surface within which the shaft 12 is received so that the cutter 34 rotates in accordance with rotation of the shaft 12. Each circular collar 70 is welded to the distal edge of inner tube 54 in the region of the mid points of each side of inner tube 54.

Typically, the angle of inclination of edge 65 is from about 30° to 60°, more typically 45°. Thus, although edge 64 is circumferentially continuous it takes the form of a cylinder which has been cut at an angle as illustrated. In the described embodiment two adjacent cutters are arranged so that their respective obliquely inclined cutting surfaces 64 are oppositely arranged to face each other so that as the cutters rotate the respective cutting surfaces 64 are in constant engagement at least at a single point of their continuous substantially truncated circular cutting surfaces. In this arrangement the actual point of contact between the two adjacent cutting surfaces reciprocates back and forth in the lengthwise extending direction of the shaft as the cutters rotate so that material processed through the cutters is cut in a sinusoidal pattern. The sinusoidal pattern corresponds to the movement of the point of contact between the respective cutting surfaces back and forth in the lengthwise extending direction of the shaft as the cutters rotate.

In the illustrated apparatus there is shown two shafts 12, 14 provided with a number of cutters 34 on each shaft. The cutters on one shaft 12 are arranged so that the respective cutting surfaces 64 are all aligned in the same direction which is in the opposite direction to that of the cutting surfaces 64 of the cutters located on the adjacent shaft 14 which are similarly all aligned in the same direction.

It is to be noted that some of the cutters shown in the apparatus of FIG. 1 are provided with two obliquely inclined cutting surfaces 64, one at either end of the cutter in order that the apparatus is more effective in cutting material, whereas the cutters at either end of shaft 12 are provided with a single inclined cutting surface 64.

As the cutting assemblies contra-rotate the respective cutting surfaces of the cutters will be maintained in contact with each other at the overlap and the effective cutting edge will reciprocate along the inclined cutting faces as the shafts rotate.

One form of the anti-wrap bar of the present invention will now be described with particular reference to FIG. 3.

One form of anti-wrap bar 80 is shown in FIG. 3 and comprises a first body portion 82 of a substantially L-shape having two arms 84, 86 and a second portion being a circular ring portion in the form of a circular collar 88. Shaft 12 is received through collar 88 so that anti-wrap bar 80 is free to pivot about shaft 12 as it rotates. A rubber stop 90 is provided at the distal end of arm 86 for contact against the inner surface of wall 4 or 6. As shaft 12 rotates, anti-wrap bar 80 remains stationary or almost so as it is prevented from rotating by contact of rubber stop 90 against wall 6 or 4.

Figure 7:
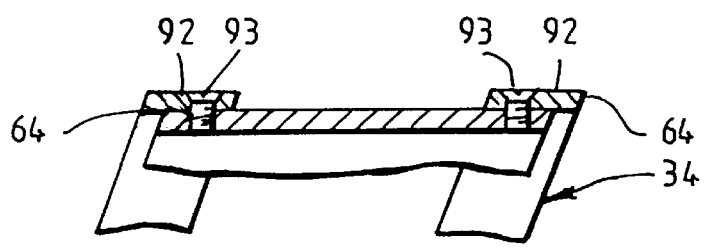
FIG. 7 is a cross-sectional view of an alternative form of the cutters of the present invention showing the method of attachment of replaceable cutting rings located at either end of the cutters.

Optionally, a slidable blade scraper is connected to arm 84 of anti-wrap member 80 in such a manner to allow the scraper to transversely slide with respect to arm 84. The end or ends of the scraper are in contact with the cutting surfaces 64 of two adjacent cutters 34. As cutters 34 rotate the action of the scraper cleans the cutting surfaces 64. One form of the replaceable cutting ring 92 is shown in FIG. 7 attached to cutter 34 to form cutting surface 64 by releasable fastening means such as countersunk screws or bolts 93.

Another embodiment of the anti-wrap bar of the present invention will now be described and comprises a jointed arm connected to one of the central shafts in such a manner to allow axial movement of the anti-wrap bar in use of the device. This form of the anti-wrap bar comprises a block having a central bore through which the central shaft is received. An extension is provided on the block in the form of a female portion of a knuckle joint. An articulated arm having the male portion of the knuckle joint is connected to the block. The other end of the articulated arm is provided with a collar through which an auxiliary shaft is received. A wear block is located intermediate the ends of the articulated arm, i.e. between the auxiliary shaft and the knuckle joint. The anti-wrap bar is located on the central shaft intermediate two adjacent cutters so that the opposed faces of the cutters engage with opposite sides of the wear block. As the cutters rotate, the wear block is forced to slidably move axially backwards and forwards along the auxiliary shaft in accordance with rotation of the cutters thereby preventing material from wrapping around the shaft and cutters in use.

Rollers 94 are provided at selected spaced apart locations in the side walls 4, 6 in contact with selected ones of cutters 34 to assist in efficient operation of the cutting installation 2 and to provide additional support for shafts 12, 14 in operation so as to prevent unwanted radial movement of the shafts when subjected to a heavy workload.

In operation of the apparatus of the present invention, material is fed by a suitable inlet means to pass through two adjacent cutters 34 of the installation 2. If the cutters 34 are arranged in modules located at multiple levels, the material will pass through each level of the cutters until being discharged through the outlet means. In some embodiments, the material after having passed through the array of cutters a first time, will be recycled to the top of the array for a further passage through the array and so on. By this means the material can be repeatedly passed through the cutting assembly for as many times as required depending upon the final size of the material that is required, which can be very fine indeed. One way of providing for repeated passage of materials through the cutting assembly is to mount the assembly inside a rotating drum or cage so that material is continuously being recycled through the assembly as the drum rotates around the assembly allowing material to fall under gravity through the cutters. This form of the device finds particular application as a domestic or commercial waste disposal unit and is particularly suitable for recycling household rubbish or garden refuse.

Figure 8:
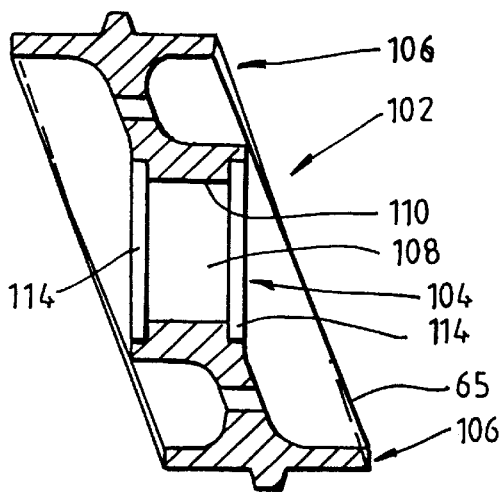
FIG. 8 is a cross-sectional view of a further embodiment of the cutter of the present invention.
Figure 9:
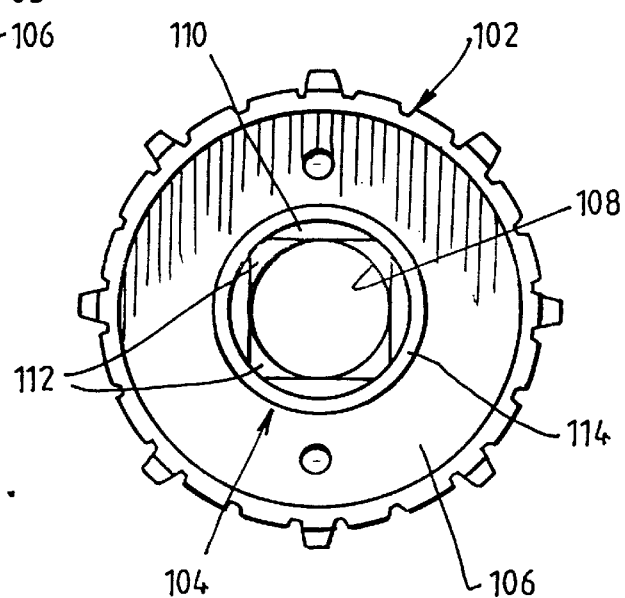
FIG. 9 is a cross-sectional view of the cutter of FIG. 8 in place on a modified shaft.
Figure 10:
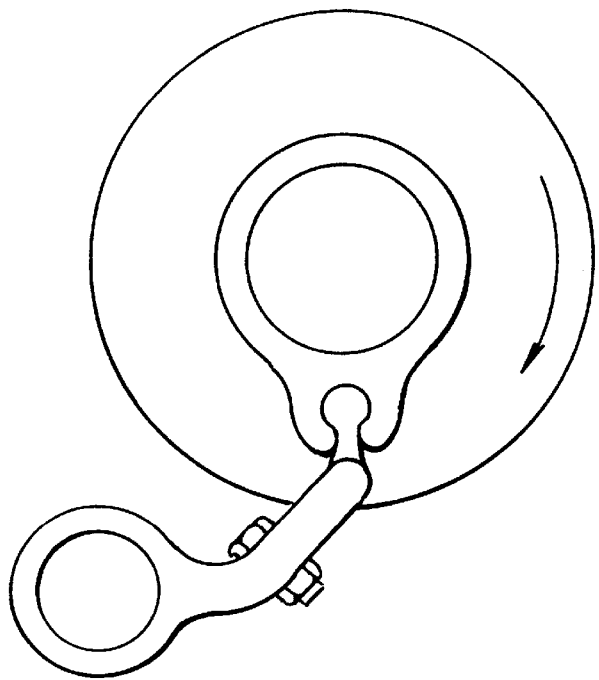
FIG. 10 is a cross-sectional view of one form of the anti-wrap device of the present invention.

Another embodiment of the cutters of the present invention will now be described with particular reference to FIGS. 8 to 10. In this embodiment, the cutters are cast as a one piece casting of a generally obliquely inclined circular casting, generally denoted as 102, comprising a central portion 104 and an annular portion 106. The central portion 104 of this casting is provided with a centrally located, substantially square bore 108 provided with four flat sections 110 at regularly spaced apart locations around the circumference of the shaft, alternately arranged intermediate rounded edges 112, for attaching the casting to the central shaft for driving the cutter in use. In this embodiment, the central shaft is substantially circular in cross-section having four flats located around the circumference of the shaft. The position of the four flats of the shaft corresponds to the position of the flat sections of the cutter 110. The radius of the curvature of the rounded edges 112 corresponds to the circumference of the central bore of the casting so that the casting when received on the shaft is held in place by a friction fit. The flat sections engage against the flat sides of the shaft between the rounded corner edges to securely locate the cast cutter on the shaft. A circular collar or stabiliser 114 is located at either end of the central portion 104 and is of the same diameter as the shaft to prevent rocking movement of the cutter on the shaft when the cutter is located on the shaft.

Another embodiment relates to the use of a stabiliser ring to assist in attaching the cutters to the shaft. For one embodiment the stabiliser ring is located in the central bore which is circular. The stabilizer ring is provided with flat sections.

Another embodiment of the anti-wrap member useful in the apparatus of the present invention is a chain having two circular rings, one at either end. One circular ring is slidably mounted on one of the driving shafts and the other circular ring is fixedly attached to an auxiliary shaft or similar with the chain being able to flex between the two captured ends. Any material passing through the cutters with a tendency to wrap around the cutters will be prevented from doing so by the chain which contacts the material and directs it to another cutter or to discharge.

Another embodiment of the present invention finds application as a community waste disposal system in which the cutting assembly can be of very large dimensions suitable for recycling or converting all of the rubbish disposed by a community. Such assemblies could replace conventional tips, pits or the like and may be located at strategic locations in the community. As the waste material produced by the cutting arrangement of the present invention is ultimately of a very small size due to being repeatedly passed through the assembly, disposal of the finely sized waste material presents no real problem.

The described arrangement has been advanced by explanation and many modifications may be made without departing from the spirit and scope of the invention which includes every novel feature and novel combination of features hereindisclosed.

Those skilled in the art will appreciate that the invention described herein is susceptible to variations and modifications other than those specifically described. It is understood that the invention includes all such variations and modifications which fall within the spirit and scope.

I claim:

1. An apparatus for reducing the size of material, comprising a pair of cutters rotatable mounted within a structure and arranged so that the cutters are each rotatable about respective spaced apart substantially parallel axes, each of said cutters having at least one substantially continuous cutting surface capable of movement circumferentially around the axes of rotation, said cutters being arranged with respect to each other to rotate simultaneously in opposite directions about their respective rotary axes with at least a part of the respective cutting surfaces of the cutters being in contact with each other, said cutting surfaces cooperating with each other to reduce the size of materials located therebetween in use as the cutters rotate simultaneously, wherein said cutting surfaces are each oppositely inclined to one another and are angularly inclined with respect to the parallel axes of rotation, and wherein there is provided at least one anti-wrap member independent of said cutter for preventing material being reduced in size by the apparatus from rotating about the axes of rotation.

2. An apparatus as claimed in claim 1 including a plurality of rotary cutters arranged in an array of cutters, said cutters all capable of rotating simultaneously.

3. An apparatus as claimed in claim 1 in which the cutters forming the array of cutters are arranged so that each alternative cutter assembly rotates in the same direction which is the opposite direction of rotation to that of the adjacent cutters.

4. An apparatus as claimed in claim 1 in which the individual cutters are arranged in rows and columns in which the cutters forming an individual column are all arranged in the same vertical plane and the cutters forming an individual row are all aligned in the same horizontal plane.

5. An apparatus as claimed in claim 1 in which the individual cutters are arranged in regularly spaced apart rows and columns.

6. An apparatus as claimed in claim 1 in which the individual cutters are arranged in pairs forming a module, wherein said modules are spaced apart from each other.

7. An apparatus as claimed in claim 1 in which the cutting modules are arranged substantially in one plane.

8. An apparatus as claimed in claim 1 in which the cutters are arranged in a herringbone-like or zig-zag pattern having a plurality of spaced-apart vertical columns and a plurality of spaced-apart horizontal rows.

9. An apparatus as claimed in claim 1 in which each cutter is carried on a shaft so that each shaft has one or more cutter associated therewith, each cutter being spring mounted or spring biased on the shaft allowing axial movement of the cutter with respect to the shaft.

10. An apparatus as claimed in claim 1 in which spring mounting of the cutters on the shafts is achieved by one or more spring means arranged such that the spring means urges the cutting surfaces of adjacent cutters o adjacent shafts into engagement with each other in order to maintain at least a part of the respective cutter surfaces of the cutters in intimate contact with each other during rotation of the cutters.

11. An apparatus as claimed in claim 1 in which the cutters are substantially cylindrical and the cutters are provided with two obliquely inclined cutting surfaces located at either end of the cylindrical cutter and arranged at an angle to the axis of rotation of the cutter.

12. An apparatus as claimed in claim 1 in which the cutting surfaces of the cutters are arranged to be substantially parallel to each other.

13. An apparatus as claimed in claim 1 in which the cutting surfaces of the cutters are inclined at about 20° to 60°, preferably 30° to 60° to the axis of rotation of the cutter.

14. An apparatus as claimed in claim 1 in which the cutting surfaces of adjacent cutters are oppositely inclined to each other and are arranged at an angle of about 45° to the central axis.

15. An apparatus as claimed in claim 1 further including a driving shaft and in which each cutter is a one piece cutter having a central portion for engaging with the driving shaft and at least one cutting surface annularly arranged around the central portion located at either end of the cutter.

16. An apparatus as claimed in claim 15 in which each cutter and the driving shaft are provided with engagement means for complementary engaging with each other to effect driving of the cutter.

17. An apparatus as claimed in claim 1 in which each cutter is provided with a collar or stabilizer ring for preventing unwanted movement of the cutter with respect to the shaft when the cutter is located on the shaft.

18. An apparatus as claimed in claim 1 in which the anti-wrap member comprises a first part having first and second arms forming an angle therebetween, and a second part which is provided with a substantially circular collar arrangement.

19. An apparatus as claimed in claim 1 further including a shaft and in which the anti-wrap member is attached to the shaft by having the shaft being received in the circular collar thus allowing pivotal movement of the anti-wrap element about the shaft in use.

20. An apparatus as claimed in claim 19 in which the anti-wrap element is provided with a slidable scraper blade capable of slidable axial movement with respect to the lengthwise extending direction of the shaft.

21. An apparatus as claimed in claim 19 in which the anti-wrap member is of a two piece construction in which the first part is a collar for attaching to the shaft and is provided with a fastening means and the second part is provided with a complementary fastening means and a second collar.

22. An apparatus as claimed in claim 1 in which the cutting surfaces of the cutters are self-sharpening.

23. An apparatus as claimed in claim 1 in which the cutting surfaces are provided with surface modifications or irregularities.

24. An apparatus as claimed in claim 1 in which the cutting surfaces are provided with troughs and crests in the form of cleats, bars, bosses or other surface projections.

25. An apparatus as claimed in claim 1 in which each cutter is provided with a replaceable cutting ring around the circumference of the cutter.

26. An apparatus as claimed in claim 1 in which the cutting modules are arranged substantially in different planes.

27. A cutting assembly including at least one module of a pair of co-operating rotary cutters rotatable mounted within a structure, each of the rotary cutters being in the form of a cylindrical tube, each of the cutters forming the pair of cutters being rotatable in unison about respective spaced apart substantially parallel axes, each cutter having a substantially continuous cutting surface disposed obliquely about said respective axes of rotation around the perimeter of the cutter, wherein said pair of cutters includes a first cutter and a second cutter, and wherein the cutting surface is oppositely angularly inclined to the cutting surface of the second cutter, and wherein at least a part of each of the respective cutting surfaces cooperatively engage with each other so that in use the cutters rotate in opposite directions to cut material located between the cutting surfaces and wherein there is provided an anti-wrap member independent of said cutter for preventing rotation of the material being cut from rotating about the respective axes of rotation.

* * * * *

UNITED STATES PATENT AND TRADEMARK OFFICE
CERTIFICATE OF CORRECTION

PATENT NO. : 6,058,822
DATED : May 9, 2000
INVENTOR(S) : Terrence J. Parke

It is certified that error appears in the above-identified patent and that said Letters Patent is hereby corrected as shown below:

Claim 10, column 10,
Line 39, "cutters o adjacent" should read -- cutters on adjacent --.

Claim 13, column 10,
Line 54, "30° to 60° to" should read -- 30° to 60°, to --.

Claim 17, column 11,
Line 4, "the shaft when" should read -- the driving shaft when --.
Line 4, "located on the shaft" read -- located on the driving shaft.

Claim 21, column 11,
Line 21, "to the shaft" should read -- to the driving shaft --.

Signed and Sealed this

Eleventh Day of September, 2001

*Attest:*

NICHOLAS P. GODICI
*Attesting Officer*  *Acting Director of the United States Patent and Trademark Office*